United States Patent
Sarto et al.

(10) Patent No.: US 12,495,799 B2
(45) Date of Patent: Dec. 16, 2025

(54) REMOVABLE, WATERPROOF MULTI-LAYER COATING HAVING ANTIBACTERIAL PROPERTIES FOR CONTACT SURFACES AND METHOD FOR THE PREPARATION THEREOF

(71) Applicant: UNIVERSITA' DEGLI STUDI DI ROMA "LA SAPIENZA", Rome (IT)

(72) Inventors: Maria Sabrina Sarto, Rome (IT); Daniela Uccelletti, Rome (IT); Antonella Polimeni, Rome (IT); Giovanni De Bellis, Rome (IT); Maurizio Bossu', Castel Giorgio (IT); Hossein Cheraghi Bidsorkhi, Rome (IT); Erika Bruni, Aprilia (IT); Irene Bellagamba, Rome (IT); Lavanya Rani Ballam, Rome (IT)

(73) Assignee: UNIVERSITA' DEGLI STUDI DI ROMA "LA SAPIENZA", Rome (IT)

(*) Notice: Subject to any disclaimer, the term of this patent is extended or adjusted under 35 U.S.C. 154(b) by 334 days.

(21) Appl. No.: 18/261,969

(22) PCT Filed: Jan. 19, 2022

(86) PCT No.: PCT/IB2022/050439
§ 371 (c)(1),
(2) Date: Jul. 18, 2023

(87) PCT Pub. No.: WO2022/157638
PCT Pub. Date: Jul. 28, 2022

(65) Prior Publication Data
US 2024/0081334 A1    Mar. 14, 2024

(30) Foreign Application Priority Data
Jan. 19, 2021   (IT) .................. 102021000000848

(51) Int. Cl.
A01N 59/16   (2006.01)
A01N 25/10   (2006.01)
(Continued)

(52) U.S. Cl.
CPC ............. A01N 59/16 (2013.01); A01N 25/10 (2013.01); A01N 59/00 (2013.01); A01P 1/00 (2021.08);
(Continued)

(58) Field of Classification Search
CPC .. A01N 59/16; C09D 7/20; C09D 7/62; A01P 1/00
See application file for complete search history.

(56) References Cited

U.S. PATENT DOCUMENTS

| 6,120,784 A | 9/2000 | Snyder, Jr. |
| 9,345,797 B2 | 5/2016 | Ling et al. |

(Continued)

FOREIGN PATENT DOCUMENTS

| CN | 101189971 A | 6/2008 |
| CN | 106283878 A | 1/2017 |

(Continued)

OTHER PUBLICATIONS

International Search Report and Written Opinion of the ISA for PCT/IB2022/050439 mailed Mar. 14, 2022, 9 pages.

*Primary Examiner* — Nathan T Leong
(74) *Attorney, Agent, or Firm* — NIXON & VANDERHYE

(57) ABSTRACT

A multi-layer coating with antibacterial and anti-COVID properties which is usable in various environments, including hospitals, and which can be easily deposited by spraying on different surfaces and capable of providing an effective removable barrier against pathogens and bacteria, which waterproof coating is characterized in that it uses graphene (Continued)

nanoparticles as an antibacterial and anti-COVID agent deposited by spraying a polymer material as a host layer on the surface to promote the dispersion and uniform surface distribution thereof, the polymer material being directly adhered by spraying to the surface to be coated or sprayed on a second polymer, in turn sprayed on the surface to be coated, which is used as an element to promote the adhesion of the first polymer forming the antibacterial and anti-COVID coating to the surface to be coated.

20 Claims, 13 Drawing Sheets

(51) Int. Cl.
| | | |
|---|---|---|
| *A01N 59/00* | (2006.01) | |
| *A01P 1/00* | (2006.01) | |
| *C09D 1/00* | (2006.01) | |
| *C09D 5/00* | (2006.01) | |
| *C09D 5/02* | (2006.01) | |
| *C09D 5/14* | (2006.01) | |
| *C09D 7/20* | (2018.01) | |
| *C09D 7/62* | (2018.01) | |
| *C09D 139/06* | (2006.01) | |
| *C09D 167/04* | (2006.01) | |

(52) U.S. Cl.
CPC ............... *C09D 1/00* (2013.01); *C09D 5/002* (2013.01); *C09D 5/021* (2013.01); *C09D 5/14* (2013.01); *C09D 7/20* (2018.01); *C09D 7/62* (2018.01); *C09D 139/06* (2013.01); *C09D 167/04* (2013.01)

(56) References Cited

U.S. PATENT DOCUMENTS

| | | |
|---|---|---|
| 2005/0058682 A1 | 3/2005 | Sharratt |
| 2007/0231291 A1 | 10/2007 | Huang et al. |
| 2019/0091109 A1* | 3/2019 | Sarto .................. A61K 6/17 |

FOREIGN PATENT DOCUMENTS

| | | |
|---|---|---|
| CN | 106727692 A | 5/2017 |
| CN | 106811967 A | 6/2017 |
| CN | 105647254 B | 6/2018 |
| CN | 108948806 A | 12/2018 |
| WO | 2017109693 A1 | 6/2017 |
| WO | 2017149474 A1 | 9/2017 |
| WO | WO2017109693 * | 9/2019 |

* cited by examiner

| Properties | Values | Method |
|---|---|---|
| Adhesion value | 3.5 N/cm | ASTM D3330 |
| Tensile strength | 49 N/cm | ASTM D3759 |
| Ultimate elongation | 45% | ASTM D3759 | a) b)

a) b)

a) b)

REMOVABLE, WATERPROOF MULTI-LAYER COATING HAVING ANTIBACTERIAL PROPERTIES FOR CONTACT SURFACES AND METHOD FOR THE PREPARATION THEREOF

CROSS-REFERENCE TO RELATED APPLICATIONS

This application is the US national stage of PCT/IB2022/050439, filed Jan. 19, 2022, which claims the priority of IT 102021000000848, filed Jan. 19, 2021. The entire contents of each foregoing application are incorporated herein by reference.

BACKGROUND OF THE INVENTION

Field of the Invention

The present invention relates to a waterproof multi-layer polymer matrix coating with antibacterial and anti-COVID properties, which is usable in various fields, in particular hospitals, obtainable by spraying on different types of surfaces and capable of providing a removable barrier to prevent the development of bacteria and eliminate pathogens in direct contact therewith. Such a coating is characterized in that it uses graphene nanoparticles as antibacterial and anti-COVID agent, which are deposited by superficially spraying a continuous film of a first polymer material having an excellent adhesion capacity on the surface to be coated, and which is previously adhered, again by spraying to the same surface to promote the dispersion and uniform surface distribution of said nanoparticles as a host layer.

If the continuous film of such a first polymer material has insufficient adhesion capacity on the surface to be coated, the use of another continuous film of a second polymer material is envisaged, capable of ensuring such adhesion, which is sprayed directly on the surface to be coated, for use as a coating on which to adhere the continuous film of the first polymer material by spraying which acts as a host layer for the nanoparticles and forms the antibacterial and anti-COVID barrier.

A feature of the invention is the use as a host layer of two specific polymers selected in that they are both biocompatible and non-toxic, one adapted to ensure good adhesion to a metal substrate and the other to substrates of plastic materials or fabrics.

The first polymer used, hereinafter referred to as polymer 1 or POL1, is Polycaprolactone (PCL), a semi-crystalline polymer with a low melting point of about 60° C. and a glass transition temperature of about −60° C., which has excellent adhesion to resin and fabric surfaces.

The second polymer used, hereinafter referred to as polymer 2 or POL2, is Polyvinylpyrrolidone (PVP) which, on the other hand, has excellent adhesion to metal surfaces.

The invention further relates to the development of a production and application method by spraying said coating on a surface consisting of materials commonly used in hospitals: metal, fabric and resin (plastic).

DESCRIPTION OF THE RELATED ART

The proliferation of antibiotic-resistant bacteria represents a significant problem which particularly affects every hospital setting and increases the likelihood of hospitalized patients developing infections during their hospitalization.

One of the possible causes of pathogen infections occurs through direct contact of the patient's body with the nosocomial surfaces which are touched frequently or with hospital equipment. In such a context, the use of nanomaterials for creating antibacterial surface treatments can represent an innovative solution to this type of problem.

In recent years there has been a growing interest in polymer materials with improved properties, which show a high antimicrobial power, given the continuous need for an improvement in the quality of life. The possible fields of application of such materials include, for example, the textile sector, the food packaging sector or that of medical devices, the use of which is aimed at preventing infections.

The use of antibacterial nano and microparticles of inorganic nature has several advantages over organic ones, including better heat resistance, high chemical stability, greater safety in the use thereof and a longer period of action.

Polycaprolactone (PCL) is a semi-crystalline polymer with a low melting point of about 60° C. and a glass transition temperature of about −60° C. PCL is a synthetic, non-toxic aliphatic polyester, which is used for biomedical applications as a means for drug delivery, in that when it is found inside the human body, it is completely degradable. Micro-dimensional additives have been used as an effective strategy to alter and improve the properties of PCL. Various types of fillers, such as clay, carbon nanotubes, silica, hydroxyapatite and $TiO_2$ have been incorporated within PCL to prepare microparticles.

Recent scientific discoveries have shown that graphene-based nanomaterials show great antimicrobial and anti-COVID properties and this without exerting a relevant cytotoxic effect on human cell lines.

Such an antimicrobial effect occurs through two main mechanisms, that of nanoblades, due to the presence of sharp edges, and that of wrapping or trapping bacteria, due to the flexible thin-film shape of the graphene nanoplatelets (GNP).

The main production processes and materials used to develop the antimicrobial coatings described in the patent documents published so far are reported below. In particular, patents related to the development of different materials with antibacterial properties are listed, and specifically those in which antibacterial polymers or nanocomposite polymer coatings connected to the subject of the present patent application have been developed. However, it should be underlined that in none of these was a polymer used as a host layer for graphene nanoplatelets presented, used as an antibacterial agent in coatings of metal, plastic or fabric surfaces, which are removable, non-toxic and waterproof.

In U.S. Pat. No. 6,120,784 A an antibacterial/antiviral coating and the related production process is described. In such a coating, the anti-pathogen agent essentially consists of PVP-I and N-9. However, there are several drawbacks: such a coating is not non-toxic for humans and does not involve graphene as an antibacterial agent; the production process is long, the coating is not removable, and many dangerous solvents are also used for the production of the material forming the coating itself.

In U.S. Pat. No. US20070231291 A1 a polymer antimicrobial agent produced by replacing nitrogen atoms in the central structure of the polymer chain of ethyleneimine polymers is disclosed. This patent deals with polymer formulations by modifying the number of nitrogen atoms, the material is not completely non-toxic to humans and is difficult to produce [13].

In U.S. Pat. No. US2005/0058682 A1 a bacteria-resistant coating for application on surgical instruments is disclosed. The antimicrobial coating consists of antimicrobial particles arranged in a polymer matrix. The patent has some limitations, including processing which occurs at high temperatures, around 371° C., and can only be applied to metal surfaces. It is further characterized by a fairly high thickness, between 0.1 and 5 mm and is not removable [14].

In China Pat. No. CN106727692A, a method is shown of preparing an antibacterial spray coating consisting of different nanocomposite materials, consisting of the polymer PVP and silver antibacterial agents. In this work silver nanoparticles were used as antibacterial agent; furthermore, the production process is expensive, time-consuming, and complex to perform [15].

China Pat. No. CN101189971A relates to the production of a nanocomposite coating with organic/inorganic antibacterial agent. The antimicrobial nanocomposite coating was produced by using different polymers and different nanoparticles, used as an antibacterial agent. The manufacturing process is dangerous, as the composite is obtained from the pyrolysis of polymers and silanes as couplants together with silver or copper-based nanomaterials [16].

In German Pat. No. DE200610006675 a multipurpose composite antimicrobial material is disclosed which is produced by pyrolysis of nanomaterials containing silver or copper and a mixture of silicone polymers and bulk agents. The production process is difficult, as it occurs at a high temperature: in fact, the pyrolysis process occurs between 500 and 1200° C.

In all these documents concerning the use of antibacterial polymers or nano composite polymer coatings, no mention is made of the use of graphene as an antibacterial agent.

By contrast, patents in which graphene is used as an antibacterial agent do not use a polymer material as a host layer for the nanoparticles. Below is a summary of all the patents where graphene is used as an antibacterial agent.

U.S. patent No. U.S. Pat. No. 9,345,797B2 relates to the development of a photothermal antibacterial material, in which the material synthesis method (with antibacterial properties) comprises three steps. Initially, graphene oxide is synthesized, followed by simultaneous reduction and functionalization with magnetic nanoparticles. Finally, an aldehyde is modified on magnetic material to produce graphene-functionalized magnetic glutaraldehyde. The antibacterial activity is achieved by means of a mechanism based on the photothermal property of graphene. The graphene is functionalized with aldehyde in order to capture bacteria and with magnetic material in order to improve the light radiation focusing. The process is not non-toxic to humans due to the use of dangerous solvents, moreover, it is only used for metal surfaces and on limited areas.

China Pat. No. CN106283878A relates to the preparation method of an antibacterial and antistatic product for rough surfaces which uses graphene decorated with silver and titanium as the antibacterial agent. The patent has some disadvantages: the production process occurs at a high temperature, around 900° C., acids are used and the production times are long.

In China patent No. CN106811967A the invention relates to the technical field of the manufacture of spinning products and refers to a preparation method of a graphene oxide-based antibacterial coating. This patent has several disadvantages: a coupling agent such as silane is used to ensure adhesion between graphene and fabric; it takes time to produce; and the method it describes can only be applied to limited types of fabrics/materials.

China Pat. No. CN105647254B discloses a graphene-based antibacterial coating. However, the process is not non-toxic to humans due to the use of dangerous solvents and is a process which takes a long time.

In China patent No. CN108948806A, graphene-based aqueous antibacterial coating was produced from a mixture of aqueous epoxy resin, aqueous acrylic resin and aqueous polyurethane from which polymer nanocomposites are produced.

This coating is not non-toxic for humans, moreover, the process temperature is about 180° C., and this makes the production complex if compared to the subject of the present patent application.

In patent document WO 2017/109693 of the same Applicant, a process was described for the growth of ZnO nano/microstructures (possibly doped with metals) on unsupported GNP, dispersed in aqueous suspension, to cover the entire surface thereof (on both sides of the flake) and allow for mass production, where the morphological properties of the ZnO nanostructures and the surface coating density of the GNPs can be controlled throughout the growth process.

The experiments carried out revealed the possibility of growing ZnO micro/nanostructures (possibly doped with metals) on both sides of unsupported GNP and in aqueous suspension, with a homogeneous and high density coating, without resorting to any reduction step involving the use of hazardous reagents. The correlation between the process conditions used for growth and the morphology, density and homogeneity of the ZNO nanorods and microrods grown on unsupported GNP was also highlighted.

The innovative procedure developed, suitable for mass production, where the hybrid ZnO-GNP nano/microstructures are produced in the presence of a seed layer, promotes the nucleation of the ZnO structures and leads to a uniform and high-density coating of GNP on both faces.

In WO 2017/149474, the same Applicant disclosed the use of graphene nanoplatelets (GNP) used individually or decorated with micro/nanorods of metal oxides, doped or undoped, as fillers of polymer adhesives in the field of orthodontics, with the aim of producing new antimicrobial dental adhesives, also exerting an antibiofilm activity. Such a process ensures a uniform dispersion of the nanofiller without the formation of agglomerates and at the same time results in a polymer adhesive in which the sharp edges of the nanostructures emerge from the free surface. Furthermore, the use of graphene nanoplatelets decorated with zinc oxide (ZNG) nanorods as nanofillers is introduced. Using ZNG, excellent antimicrobial properties can be achieved with a nanofiller weight ratio which is lower than that used in the case of undecorated graphene nanostructures. Furthermore, by controlling the size of the ZnO crystal decorating the surface of the ZNGs, it is possible to modulate the color and photoluminescence properties of the new dental adhesive, allowing the polymerization depth of the resulting photopolymerizable composite to be improved.

In addition to the patent documents mentioned above, the prior art shows some scientific publications which can be connected in some manner to the subject of the present invention:

Zhipo Zhao, et al 2019 reports the manufacturing method of a composite aluminum matrix antibacterial coating loaded with graphene and silver nanoparticles. This metal matrix antibacterial coating avoids the drawbacks inherent in organic coatings and can be used on both hospital surfaces and at home or in laboratories. On the other hand, the preparation method has some criticalities: in fact, the production occurs at high temperatures, around 300° C., and takes time. Metal particles are used, such as aluminum and silver, and the coating can only be applied on limited surfaces.

The research work "Antibacterial Graphene oxide coatings on polymer substrate", presented by Yiming Liu, et al. 2018, discloses the production of graphene oxide coatings on silicone rubber substrate, and antimicrobial activity thereof against *E. coli* and *S. aureus* bacteria was investigated. However, several hazardous solvents and coupling agents, such as silane, and some acids, are used to modify the graphene surface.

Wei Shao, et al. 2015, worked on the scientific article entitled "Preparation, Characterization, and Antibacterial Activity of Silver Nanoparticle-Decorated Graphene Oxide Nanocomposite". This research activity involved the production of a graphene oxide nanocomposite decorated with uniform silver nanoparticles (AgNPs). Similar to the other research, the manufacturing process is time-consuming, expensive, and cannot be used as a surface coating.

Very recent studies have highlighted the anti-COVID efficacy of graphene-based nanostructures (A. K. Srivastava et al, "Potential of graphene-based materials to combat COVID-19: properties, perspectives, and prospects", *Materials Today*, Chemistry 18 (2020) 100385; V. Palmieri et al., "Can graphene take part in the fight against COVID-19?", Nano Today 33 (2020) 100883).

However, according to the patent documentation described above and the scientific publications available to date, the problem of reaching, through a simple on-site spraying, with the same modes followed with a common deodorant, polisher or brightener, an innovative multi-layer coating for generic metal, plastic, or fabric surfaces, in particular in hospital environments, in the form of a continuous polymer film with excellent water-repellant features, on which nanoparticles with antibacterial and anti-COVID properties are deposited, overcoming the problems substantially related to the need of a uniform dispersion and surface distribution of the nanoparticles which must remain partially on the surface on the polymer matrix in order to exert the antimicrobial effect thereof remains unsolved, also due to the fact that said polymer matrix must be capable of ensuring correct adhesion to the surface to be coated, whether metallic, plastic or a fabric. In fact, the adhesion problems arising on a metal substrate, of thin nanoparticle films, even with polymer binder, are very different from those which arise on a plastic substrate (such as synthetic fabrics and polymer resin substrates).

The task of the present invention is to overcome such problems by providing a solution which allows distributing an antibacterial/anti-COVID agent to a material or fabric, in order to obtain antimicrobial and anti-COVID surfaces which reduce the contact and diffusion of pathogen microorganisms.

According to the invention, such problems have been solved:
by coating the surface to be protected by spraying with a polymer film acting as a "host" and then depositing thereon, again by spraying, nanoparticles with antimicrobial and anti-COVID properties, and if necessary, first covering, always by spraying, the surface to be protected with another polymer film capable of ensuring adequate adhesion of the layer which acts as a binder for the nanoparticles.

SUMMARY OF THE INVENTION

Therefore, the present invention relates to a multi-layer polymer matrix coating with nanomaterials suitable for use as a removable, waterproof antimicrobial and anti-COVID barrier, which can be deposited on different surfaces by spraying for nosocomial surface disinfestation applications.

In particular, the invention provides a method for transforming a polymer layer, adapted to coat a nosocomial or similar surface of a different nature, into a barrier capable of preventing the development of bacteria and eliminating pathogens in direct contact therewith, using such a polymer layer as the host layer of a surface dispersion of graphene nanoplatelets, which exhibit antimicrobial and anti-COVID activities (A. K. Srivastava et al, "Potential of graphene-based materials to combat COVID-19: properties, perspectives, and prospects", Materials Today, Chemistry 18 (2020) 100385; V. Palmieri et al., "Can graphene take part in the fight against COVID-19?", Nano Today 33 (2020) 100883), preferably by spraying, avoiding the complete incorporation thereof.

As an innovative anti-bacterial/anti-COVID material, graphene nanoplatelets have the advantage, when compared with other antimicrobial agents, of having a low degree of cytotoxicity and good compatibility. They also show a high antibacterial activity when compared with other graphene-based nanomaterials.

The invention further relates to both the preparation method of the antibacterial and anti-COVID surface, as a multi-layer coating, and the subsequent spraying method of the coating on the different substrates.

The term "multi-layer structure", as used below, refers to a design of the coating in which the constituent elements are arranged on two or more successive layers. The different layers are sprayed on the surface to be coated based on the adhesion properties thereof on the specific substrate considered and based on the antibacterial and anti-COVID properties thereof.

Furthermore, the active components of the elements forming the coating (i.e., the nanoparticles conferring the antibacterial and anti-COVID properties) can be arranged on the surface to be protected considering different combinations and quantities of the different types of nanoparticles, in order to optimize the final properties of the coating.

As part of the experiments carried out, the antibacterial and anti-COVID coating was applied on three different surfaces: metal, plastic and fabric.

Such an innovative antibacterial and anti-COVID coating, deposited by spraying, has the following features:
Good resistance to moisture;
Use of graphene as an antibacterial and anti-COVID agent;
High antibacterial properties;
Good adhesion to the surface to be coated;
Use of PVP to ensure high adhesion between the metal and the main "host" polymer (PCL);
Use, during the production method, of ecological solvents, such as ethanol and acetone;
Easy to produce;
Easy to apply by spraying;
Fast production method;
Low-temperature production;
Quick and easy removal with ethanol or acetone or by rubbing with plenty of water;
Low-cost;
Not toxic to humans.

BRIEF DESCRIPTION OF THE DRAWINGS

Further features and advantages of the invention will become apparent from the following detailed description, with reference to the accompanying drawings, in which.

DETAILED DESCRIPTION

Figure 1:
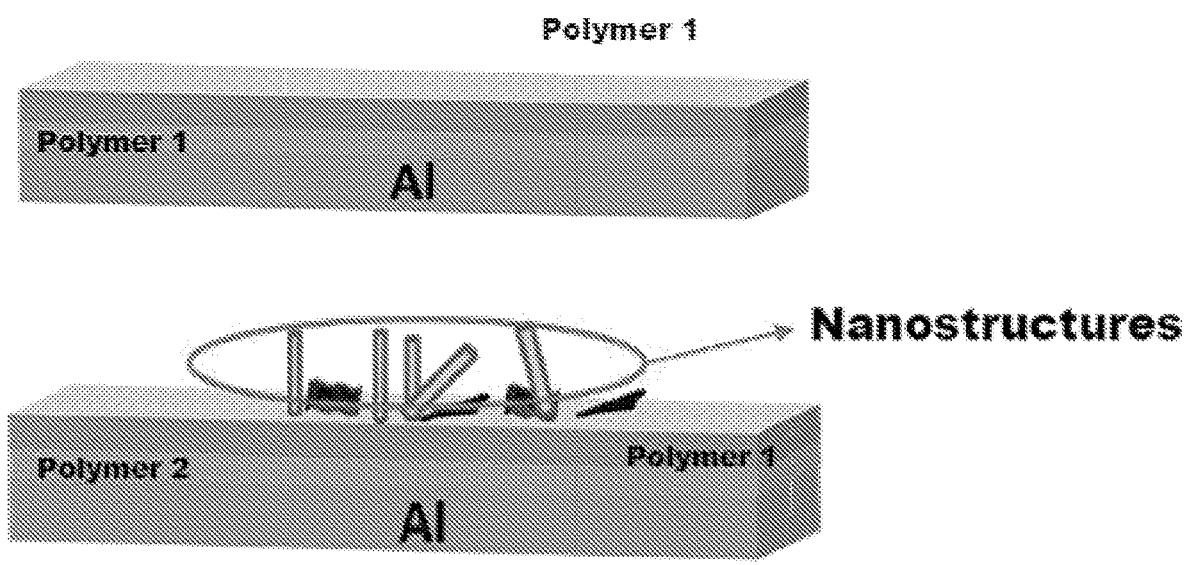
FIG. 1 shows the configuration of the double-layer coating on aluminum substrate without (a) and with (b) nanostructures.
Figure 2:
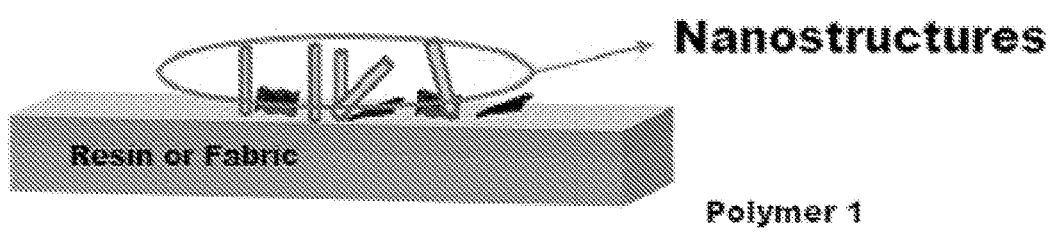
FIG. 2 shows the antimicrobial and anti-COVID treatment of the present invention, sprayed on a thin layer of PCL deposited on resin and fabric.

As already mentioned, the invention consists of an innovative coating consisting of a polymer coating on which graphene nanoparticles are deposited by spraying and which has antibacterial and anti-COVID properties. The following description discloses, by way of example, the application of the invention to three different types of surfaces.

Specifically, the degree of bacterial inhibition was evaluated due to graphene nanoplatelets and zinc oxide nanorods—a particular ZnO nanostructure characterized by rod shape and diameter between 25 nm and 40 nm and length between 100 nm and 1 µm sprayed onto a "host" polymer which is in turn deposited on a substrate of a different nature: metal, plastic and fabric. The suspensions were applied to the substrates by a spraying technique.

The main antimicrobial mechanism exhibited by such nanostructures is based on the perforation of the bacterial wall. This damage mechanism is typical of graphene nanoplatelets and zinc oxide nanowires.

The antimicrobial activity of the coating was evaluated in relation to Gram-positive (*Staphylococcus aureus*) and Gram-negative (*Pseudomonas aeruginosa*) bacteria, which represent the main pathogens associated with nosocomial infections.

The results obtained from the test carried out using the "colony forming units count" (CFU) method show an excellent antimicrobial behavior of the coatings of the present patent.

In general, the coating of the present invention consists of a host polymer the main function of which is to promote the partial dispersion of the nanoparticles, without allowing the total incorporation thereof in the polymer matrix.

A second function of the polymer is to ensure adhesion to the surface to be coated, promoting the formation of a continuous film.

Depending on the surface on which it is applied, it may be necessary to use a second polymer, in place of or in combined action with the host polymer, so that the creation of the nanoparticle barrier, the adhesion to the surface to be coated, and the creation of a continuous film are simultaneously ensured.

Production of colloidal suspensions and antimicrobial nanomaterial coatings.

The following carriers were used for the production of suspensions of nanostructures with antimicrobial properties—antibiofilm, without fixed residue:
1. Ethanol
2. Isopropanol
3. Hydroalcoholic solutions The first step of the study was aimed at the choice of polymers.

For the creation of the antimicrobial and anti-COVID coating, two different commercial polymers were used, the choice of which depends on the type of surface on which the antibacterial and anti-COVID coating must adhere, i.e., whether a metal surface or a resin or a fabric; said polymers are both biocompatible and non-toxic, and are used as binder for the GNP and ZnO nanoparticles, so as to ensure good adhesion to the substrate.

The first polymer used, hereinafter referred to as polymer 1 or POL1, is Polycaprolactone (PCL), a semi-crystalline polymer with a low melting point of about 60° C. and a glass transition temperature of about −60° C. and which has excellent adhesion to resin and fabric surfaces.

The second polymer used, hereinafter referred to as polymer 2 or POL2, is Polyvinylpyrrolidone (PVP) which has excellent adhesion to metal surfaces.

PCL has poor water solubility.

Polymer 2 (i.e., PVP) was dissolved in ethanol at room temperature (25° C.) using a magnetic stirrer, while polymer 1 (i.e., PCL) was dissolved in acetone at a controlled temperature of 30° C. using a magnetic stirrer.

The choice of solvents such as ethanol and acetone was suggested by the rapid evaporation at room temperature which characterizes them and by the excellent rheological behavior of the two polymers towards such solvents, as verified by specific rheological tests. This last aspect ensures excellent sprayability properties of the obtained mixtures.

Nanostructures used for producing the treatments

The second step of the study concerned the selection of the nanostructures used for producing the treatments and obtaining the antimicrobial and anti-COVID properties.

Four different types of nanostructures were dispersed in the active suspensions, and are used in a concentration range between 2 mg and 10 mg with respect to 100 mg of solvent. Said Nanostructures are:
 (i) Graphene nanoplatelets (GNP);
 (ii) Zinc oxide nanorods (ZNO), where nanorod indicates a morphology of objects on the nanoscale with a rod shape, in which the average diameter is between 20 nm and 50 nm and the length is between 100 nm and 1 μm;
 (iii) GNPs decorated with zinc oxide nanorods (ZNG);
 (iv) GNP+ZNO.

The combination of GNP and ZNO was considered as a replacement for graphene nanoplatelets decorated with zinc oxide nanorods, so as to minimize the nanomaterial production costs and times.

Treatment Production Method and SEM Characterization

The next step involved the treatment production method and the characterization thereof through SEM microscopy (scanning electron microscope), AFM microscopy (Atomic Force Microscopy) and functional tests (adhesion and antimicrobial).

As regards the preparation of the nanoparticles for spraying, in a first moment, the interdispersed graphene was thermally expanded and then sonicated for 20 minutes in acetone, by means of a probe sonicator; the ZnO nanorods were then sonicated in acetone for 3 minutes, by means of an ultrasonic bath.

As already mentioned, the surfaces (otherwise indicated as substrates hereinafter) on which the antibacterial and anti-COVID coatings were sprayed consist of materials which best represent the objects/devices commonly used in hospitals: metal, fabric and plastic or polymer resin.

As regards fabric and polymer resin, samples of substrates actually used in a hospital environment were used; aluminum was used for metals.

In fact, the adhesion problems arising on the metal substrate, by thin nanoparticle coatings even with polymer binder, are very different from those which arise on a plastic substrate (such as synthetic fabrics and polymer resin substrates).

Therefore, in order to develop and test a coating with adequate adhesion features for metal substrates, it was decided to carry out tests on aluminum-based metal film, as they are sufficiently representative for the purpose of solving adhesion problems.

Different mixtures of solvent and polymer were made with different concentrations of polymer, between 1% and 15% by weight, in order to identify the optimal composition which with the minimum polymer content would allow the creation of a continuous film, with good adhesion properties on the substrate and good water-repellant features.

Excellent adhesion properties of polymer 1 were obtained on the polymer-type substrates (the synthetic fabric and the resin substrate) also exhibiting excellent water-repellant properties.

Furthermore, polymer 2 obtained excellent adhesion properties on aluminum, but the water-repellent properties were not as good.

Therefore, as regards metal surfaces, it was decided to operate by exploiting the two polymers in a combined manner, thus enhancing the properties of both. A two-layer film was thus created, first overlapping the aluminum layer with polymer 2, exploiting the excellent adhesion thereof on metal, even if poorly hydrophobic, and then overlapping this layer of polymer 2 with polymer 1 used as a binder, in order to obtain excellent hydrophobicity features and excellent adhesion on the polymer substrate.

The nanostructures (GNP, ZNO or the combination of the two, or ZNG) were then sprayed on the polymer film 1 which thus acts as an adhesive coating for the nanoparticles.

FIG. 1 shows the optimized configuration of the polymer 1 and polymer 2 bilayer with nanostructures on an aluminum substrate.

In particular, while polymer 1 has good adhesion only on fabric and resin and has such features and properties that it can be used as an antimicrobial and anti-COVID agent (being able to incorporate GNP and ZnO nanorods on the surface), polymer 2 has a good adhesion to steel but has very poor adhesion to resin and fabric. Therefore, it was decided to use a coating formed by a first layer consisting of polymer 2 in direct contact with the aluminum (to ensure adhesion to the substrate) and a second layer consisting of polymer 1, used as a binder, on which the GNP and ZnO nanoparticles were then applied.

As regards coating resin or fabric surfaces, given the excellent adhesion and hydrophobic properties of polymer 2 towards these surfaces, it was not considered necessary to use a second polymer.

Thus polymer 1, which has excellent adhesion to both fabric and resin, was used as a binder and was deposited directly onto the substrate. The spraying operation of polymer 1 was carried out so as to ensure the creation of a homogeneous surface and ensure good adhesion of the nanoparticles thereto. The GNP and ZnO nanoparticles were then sprayed (FIG. 2).

The samples were prepared by spraying different combinations of polymers and nanostructures on the three substrates. SEM characterizations, rheological measurements, wettability tests and bacterial viability tests were carried out on the samples prepared at different concentrations of nanomaterials in the range 2-10 mg (polymer only, polymer+GNP, polymer+GNP+ZNO).

Some tests carried out with a concentration of nanostructures equal to 5 mg are reported below, merely by way of example.

The images obtained from the SEM analysis for the various samples prepared show the morphological surface of the modified substrate by the insertion of nanoparticles for antimicrobial and anti-COVID purposes.

Figure 3:
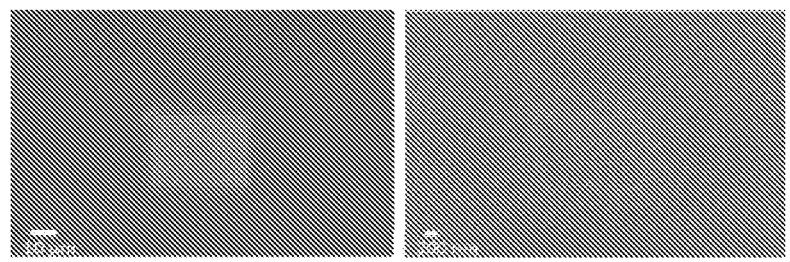
FIG. 3 shows SEM images of the surface of the antimicrobial and anti-COVID material arranged on different substrates.
Figure 3:
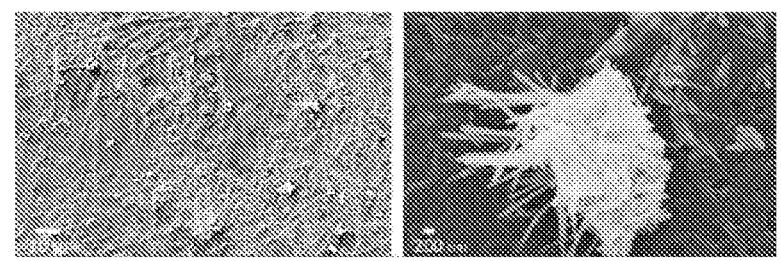
Figure 3:
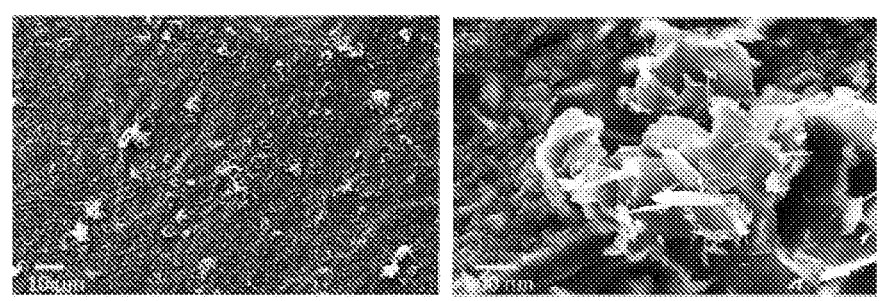

Images a) and b) in FIG. 3 show the morphology of polymer 2 applied to the aluminum substrate: as shown by said images, polymer 2 is applied homogeneously and uniformly on the metal substrate, covering the entire surface thereof. Again from the images it can be seen that polymer 2 has a smooth surface suitable for spraying the subsequent layer (polymer 1).

Images c) and d) in FIG. 3 show the morphological surface of polymer 1 relative to the multi-layer configuration (POL2+POL1+GNP+ZNO) on an aluminum substrate.

To confirm the hypotheses made, the analysis showed that polymer 1 homogeneously covers the entire surface and the deposited nanoparticles are well adhered thereto.

Furthermore, based on what can be seen from the SEM images, the GNP and ZnO nanoparticles were homogeneously sprayed over the entire surface.

Figure 4:
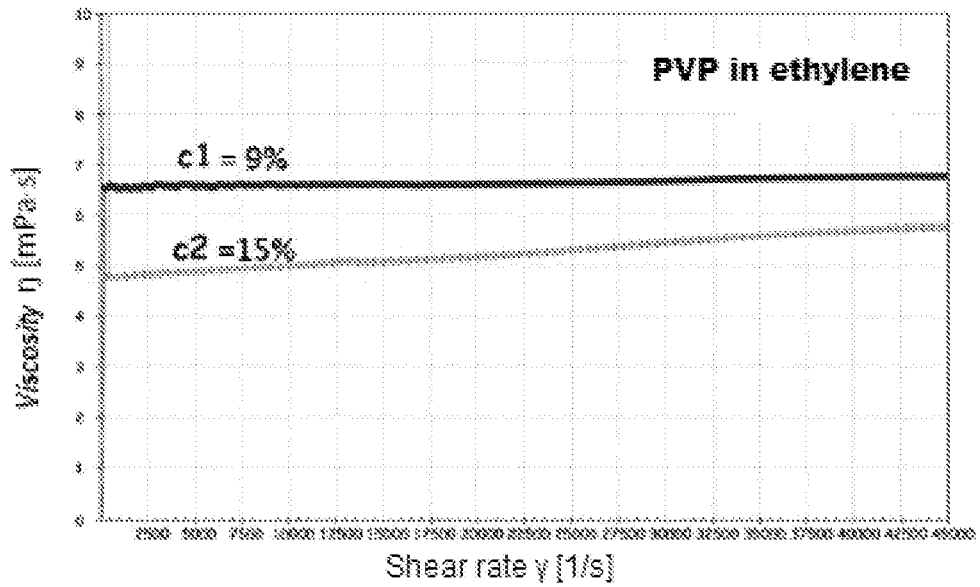
FIG. 4 shows the comparison between the viscosity curves obtained for PVP in alcoholic solution in the two minimum and maximum concentrations, $c1=9\%$ by weight and $c2=15\%$ by weight, considered in this study.

Images e) and f) in FIG. 4 show the surface of polymer 2 with GNP+ZNO nanoparticles on the fabric substrate.

The entire surface of the fabric was homogeneously covered with polymer 1. The GNP and ZnO nanoparticles were also uniformly sprayed on polymer 2 and perfectly adhered thereto.

A visual investigation of the coatings produced shows that both types have excellent adhesion features to the substrate. The color is transparent white. The presence of graphene nanostructures gives a slight gray tint.

Rheological Characterizations of the Colloidal Suspensions

The rheological measurements were performed in rotational regime and in shear rate control, using an Anton Paar MCR 302 rotational rheometer, provided with concentric cylinder geometry, available at the SNN-Lab of the "La Sapienza" University of Rome.

The peculiar measurement system used allows studying the rheological behavior of the solutions/suspensions carried out in a very high velocity gradient range, so as to simulate the shear rate values corresponding to the spraying method used.

The measurements were performed on a minimum of three samples for each type, in the shear rate range between 0.1 and 45000 s−1. All the measurements were performed at 23° C., controlling the temperature via a Peltier cell integrated in the lower geometry of the measurement system.

Polymer 1 Dissolved in Ethanol

The measurements carried out on PVP solubilized in ethanol at the minimum concentration of 9% by weight, which made it possible to obtain a uniform film on the metal substrate with excellent adhesion features, showed a behavior of the pseudo-Newtonian type (viscosity independent of the shear rate) in the range of velocity gradients investigated.

In particular, the viscosity of the solution was found to vary between 4.78 mPa·s, for the lowest shear rates, to slightly rise to 5.77 mPa·s, for the highest shear rates (45000 s−1), thus highlighting the almost virtual independence of viscosity from shear rate.

Polymer 1 Dissolved in Ethanol and Loaded with GNP

The rheological measurements carried out on PVP solubilized in ethanol with a higher concentration (equal to 15% by weight), showed an almost perfectly Newtonian behavior in the range of velocity gradients investigated.

In particular, the viscosity of the solution was found to vary between 4.78 mPa·s for the lowest shear rates, to slightly rise to 5.77 mPa·s for the highest shear rates (45000 s−1), thus highlighting the almost virtual independence of viscosity from shear rate.

The measurements carried out on PVP solubilized in ethanol with a higher concentration (equal to 15% by weight), showed an almost perfectly Newtonian behavior in the range of velocity gradients investigated.

In particular, the viscosity of the solution was found to vary between 6.52 mPa·s and for the lowest shear rates, to slightly rise to 6.77 mPa·s at the maximum imposed shear rate (45000s−1).

FIG. 4 shows a comparison between the viscosity curves of PVP solubilized in ethanol at the two concentrations considered (the minimum and the maximum compatible with the creation of a uniform film which dries in a few seconds).

The measurements performed on PCL solubilized in acetone at the minimum concentration of 3% by weight considered in this study and sufficient to generate a uniform film with good adhesion properties on a polymer substrate showed a behavior far from the Newtonian regime: in particular, as the shear rate increases, an increase in viscosity is first observed which then decreases for higher shear rates, after reaching a maximum at 32000 s−1.

The viscosity of the solution varies between 3.22 mPa·s at the beginning of the test to rise up to a maximum of 14.08 mPa·s at 32000 s−1, up to then decrease to 4.48 mPa·s at 45000 s−1. The increase in viscosity found for the intermediate shear rates is due to the formation of a polymer film by separation from the organic solvent, as shown in FIG. 4.

A new sample was then produced in which polymer 1 (PCL) is solubilized in acetone at a higher concentration equal to 5% by weight.

From the analyses carried out on this sample, a consistent increase in the initial viscosity is observed which reaches the value of 12.94 mPa·s at 0.1 s−1. Also in this case, as the shear rate increases, an increase in viscosity is observed, which reaches a first maximum of 19.23 mPa·s at 33000 s−1; the viscosity then decreases and then increases again and reaches a second maximum, of lower intensity with respect to the previous one and corresponding to 17.85 mPa·s at 39800 s−1; lastly the viscosity decreases to the final value of 15.87 mPa·s at 45000 s−1.

Finally, a third sample was produced in which polymer 1 is solubilized in acetone in a concentration equal to 7% by weight. The viscosity curve shows the appearance of a maximum, even if in this case the maximum viscosity is recorded for slightly lower shear rates.

The initial viscosity value, at a shear rate of 0.1 s−1, is equal to 21.44 mPa·s resulting, as expected, higher than samples with lower concentrations of polymer in solution. The maximum of 25.57 mPa·s is found at 30,000 s−1, a value slightly lower than the shear rates recorded at the relative maximums of the previous samples, while the final viscosity (at 45,000 s−1) is 22.59 mPa·s.

Figure 5:
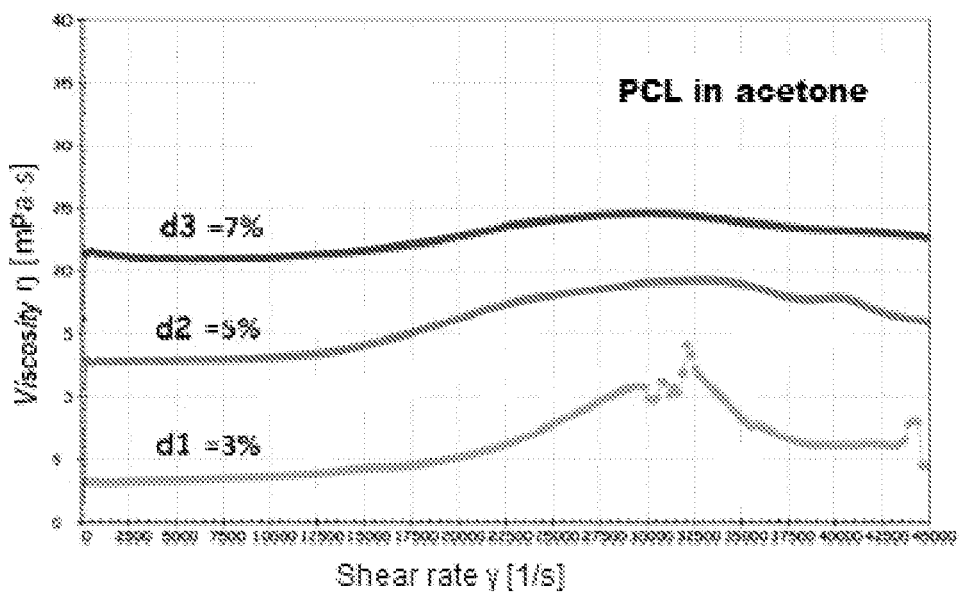
FIG. 5 shows the comparison between the viscosity curves obtained for samples consisting of PCL acetone solutions with increasing concentrations, from the minimum to the maximum considered in this study: 3% by weight, 5% by weight and 7% by weight.

FIG. 5 shows a comparison between the viscosity curves measured for the three samples made by varying the weight fraction of PCL in acetone.

As already mentioned, the formation of a polymer film during the rheological measurement was found only in the case of polymer 1 at minimum concentration (3%) on the weight of the solvent (acetone). However, repeated rheological measurements also on the samples with higher concentrations, at 10' intervals from the end of each test, first showed an increase in the viscosity curves (with higher viscosity values over the entire shear rate range) and then, for the last measurement, the formation of a polymer film.

Figure 6:
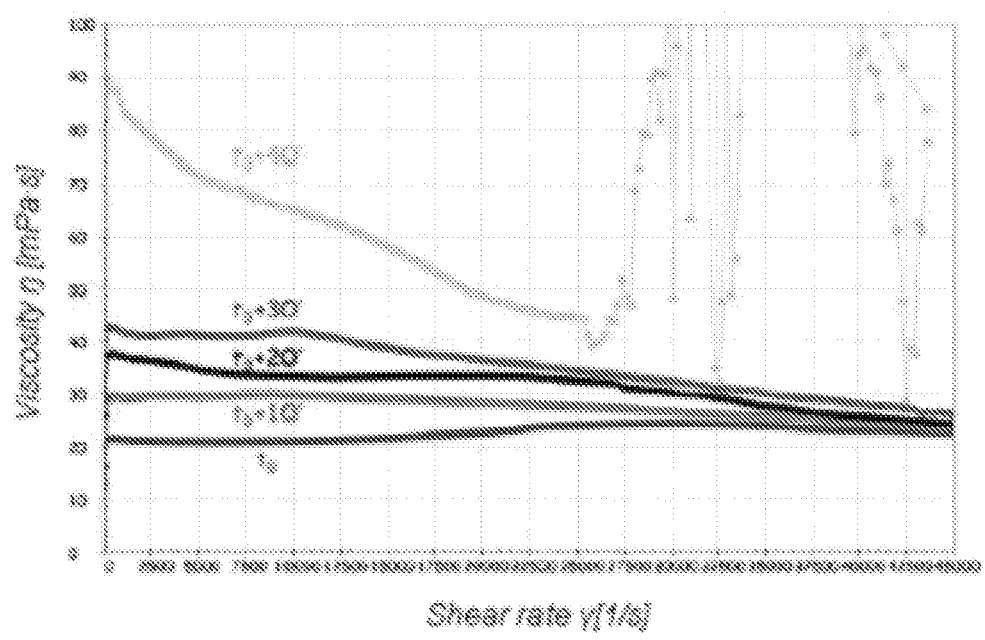
FIG. 6 shows the viscosity curves measured on the same PCL sample with a maximum concentration of 7% by weight, in successive time intervals. 3200 s elapse between the first and last test.

The viscosity curves measured on the same sample at the maximum concentration of polymer considered (7%), at successive intervals in which each test has a total duration of 200 s, are shown in FIG. 6.

For the measurement performed at time t0+40' (t0 being the start time of the first test), the formation of the film is indicated by much higher viscosity values than those previously measured. This film formation is clearly visible in the results shown in FIG. 6 and is attributed to the continuous evaporation of solvent during the course of the measurements.

As regards the wettability of the coatings produced, the results of the measurement of the contact angle on different antimicrobial and anti-COVID coatings, applied on the three substrates described above, are reported below.

Test on Aluminum Substrate and Aluminum with Polymer 2+Polymer 1 Coating and Nanostructures 1st Specimen: Aluminum Substrate Coated with Polymer 2+Polymer 1

The layer of polymer 2 is first sprayed onto the aluminum sheet and then the layer of polymer 1 is sprayed. The presence of polymer 2 allows good adhesion to the Al substrate.

Table 1 shows the contact angle values measured on the 5 drops of distilled water.

TABLE 1

| Number of drops | Contact angle θ (°) |
| --- | --- |
| 1 | 70.68 |
| 2 | 73.76 |
| 3 | 72.90 |
| 4 | 73.46 |
| 5 | 74.70 |
| Average | 73.10 |

2nd Specimen: Aluminum Substrate Coated with Polymer 2+Polymer 1+GNP

After having sprayed the two binders (first polymer 2 and then polymer 1) onto the substrate, the GNP is uniformly distributed over the substrate. The average value of the contact angle is slightly higher with respect to the case without GNPs. Also in this case, it is observed how the presence of GNP increases the contact angle value.

The results are presented in table 2.

TABLE 2

| Number of drops | Contact angle θ (°) |
| --- | --- |
| 1 | 78.36 |
| 2 | 79.92 |
| 3 | 77.08 |
| 4 | 79.31 |
| 5 | 77.04 |
| Average | 78.34 |

3rd Specimen: Aluminum Substrate Coated with Polymer 2+Polymer 1+GNP+ZnO Nanorods The antimicrobial and anti-COVID surface consists of polymer 2+polymer 1 containing GNP and ZnO nanorods. The surface of polymer 2+polymer 1+GNP and ZnO nanorods is more hydrophobic than that with GNP alone, even if the contact angle is always less than 90°. Such an effect is produced by the combination of the two types of nanostructures deposited on the polymer surface, the graphene nanoplatelets which are notoriously hydrophobic and the ZnO nanorods which give a nano-roughness of the surface such as to determine a slight reduction of the surface energy which leads to an increase in hydrophobicity and therefore to a greater value of the contact angle [9, 10].

The results are presented in table 3.

TABLE 3

| Number of drops | Contact angle θ (°) |
| --- | --- |
| 1 | 80.80 |
| 2 | 84.24 |
| 3 | 82.30 |
| 4 | 81.10 |
| 5 | 82.13 |
| Average | 82.11 |

Figure 7:
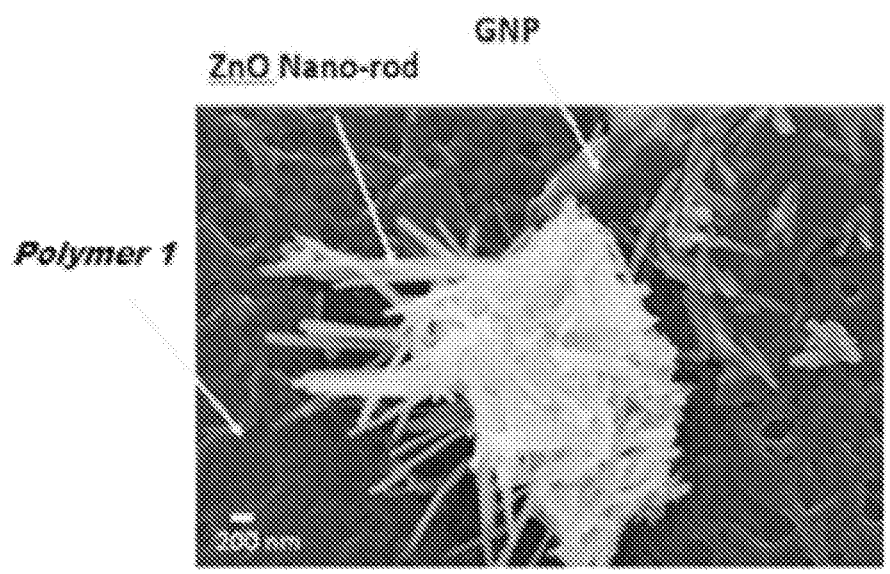
FIG. 7 shows a detail of the SEM image of the surface of the bi-layer polymer coating with GNP and ZnO nanoparticles.

The morphology of the multi-layer coating observed with SEM (FIG. 7) confirms that GNP and ZnO are well adhered to the polymer binder and thus to the aluminum substrate. The spraying of GNP and ZnO is uniform and homogeneous over the entire surface.

Figure 8:
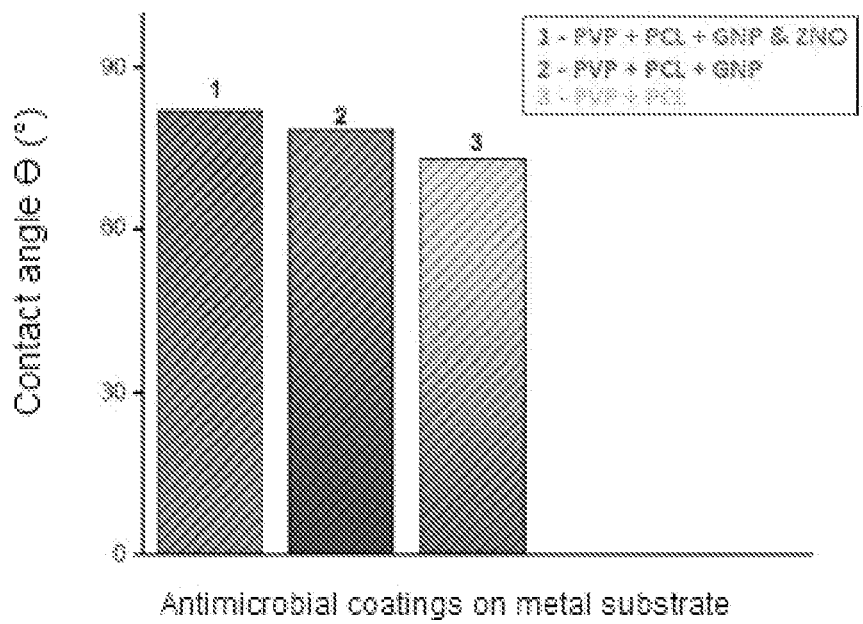
FIG. 8 is a graphic depiction of the contact angles on different surfaces.

The results obtained are reported in FIG. 8 and show the excellent hydrophobicity of the coating with the nanomaterials used.

The results shown above indicate that the ZNO+GNPs are distributed uniformly and homogeneously on the binder of polymer 1 and this involves a decrease in the surface energy as they cover the entire polymer surface. Therefore, the value of the contact angle increases.

Test on a Substrate of Synthetic Fabric and Synthetic Fabric with Coating of Polymer 1 and Nanostructures As already stated, polymer 2 does not have good adhesion on fabric and resin substrates, unlike polymer 1, which adheres perfectly thereto. The results of the tests for the measurement of the contact angle carried out on the fabric substrate, with antimicrobial and anti-COVID coating of GNP and GNP+ZnO distributed on the binder in polymer 1 are shown below.

1st specimen: modified surface—polymer 1 on fabric substrate

After the preparation of the solution of polymer 1, it was sprayed onto the fabric substrate. Since fabric is more hydrophobic with respect to aluminum, the contact angle measured in this case is greater.

The results are shown in table 4.

TABLE 4

| Number of drops | Contact angle θ (°) |
| --- | --- |
| 1 | 86.03 |
| 2 | 87.44 |
| 3 | 85.92 |
| 4 | 87.69 |
| 5 | 87.80 |
| Average | 86.97 |

2nd specimen: fabric substrate coated with polymer 1+GNP

Polymer 1 acts as a binder for the graphene nanoparticles sprayed onto the fabric. The nanoparticles are thus well adhered and connected to the fabric substrate and this leads to an increase in the contact angle value, with respect to the presence of only polymer 1. The contact angle increases slightly with respect to the presence of only polymer 1. The hydrophobic behavior increases if GNP is incorporated into the polymer binder.

The results are shown in table 5.

TABLE 5

| Number of drops | Contact angle θ (°) |
|---|---|
| 1 | 85.93 |
| 2 | 84.58 |
| 3 | 84.34 |
| 4 | 82.09 |
| 5 | 83.92 |
| Average | 84.17 |

3rd specimen: fabric substrate coated with polymer 1+GNP and ZnO nanorods

Polymer 1 and then the suspension containing GNP and ZnO nanorods was sprayed onto the fabric substrate. The coating thus obtained has a hydrophobic behavior since the measured contact angle is greater than 90° (average value equal to 94.57°).

The results are presented in table 6.

TABLE 6

| Number of drops | Contact angle θ (°) |
|---|---|
| 1 | 92.63 |
| 2 | 94.92 |
| 3 | 96.30 |
| 4 | 90.08 |
| 5 | 98.93 |
| Average | 94.57 |

From the results previously shown, it is apparent that the modified surface consisting of polymer 1+GNP and ZnO nanorods is that with the greatest average contact angle value, which therefore is the surface with the best hydrophobic behavior on the fabric substrate.

Figure 9:
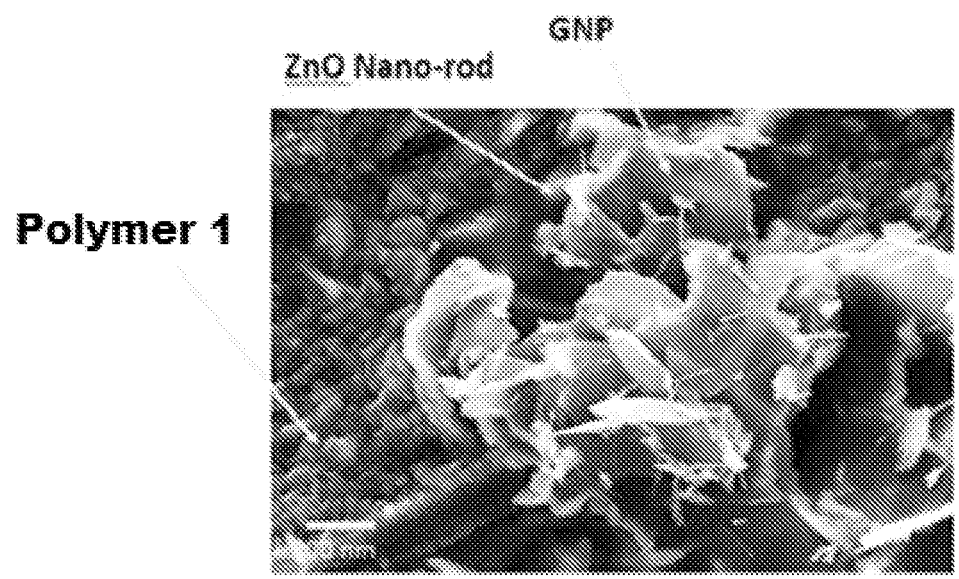
FIG. 9 is a SEM image of the antimicrobial and anti-COVID PCL+ nanorod surface of ZnO and GNP.
Figure 10:
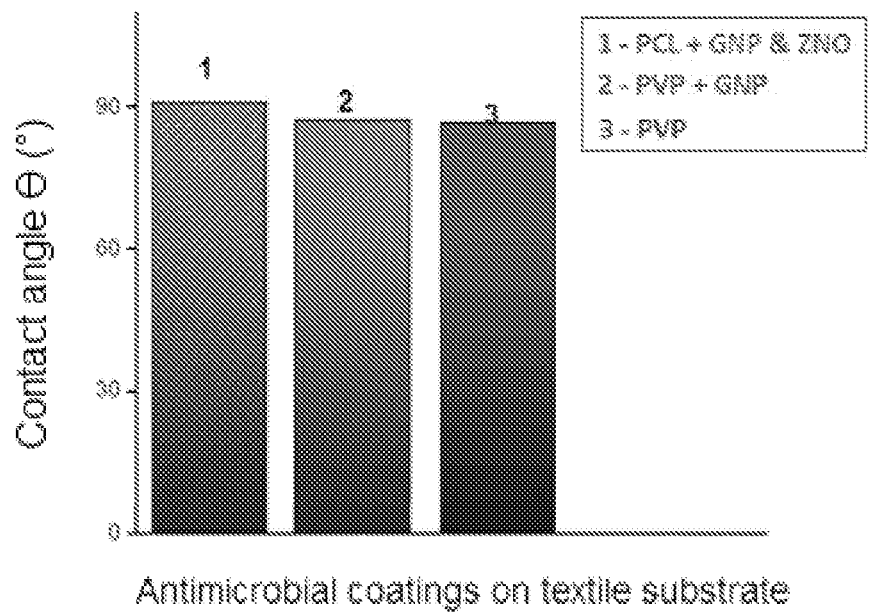
FIG. 10 shows contact angle values for various antimicrobial and anti-COVID surfaces with PCL on fabric.

The morphology of the multi-layer coating observed with SEM (FIG. 9) confirms that GNP and ZnO are well adhered to the polymer binder and thus to the fabric substrate. The spraying of GNP and ZNO is uniform and homogeneous over the entire surface.

The results obtained are reported in FIG. and show the excellent hydrophobicity of the coating with the nanomaterials used.

To ensure the maintenance of the antimicrobial and anti-COVID properties of the developed coatings over time, it is necessary to verify that they effectively adhere to the substrates on which they are to be applied.

To verify such features, adhesion tests were carried out on the following coatings, by way of non-limiting example, the data corresponding to 5 mg of nanostructures are reported:
1) Coating on metal substrate:
   a) PVP+PCL
   b) PVP+PCL+GNP (5 mg)
   c) PVP+PCL+GNP (5 mg)+ZNO (5 mg)
2) Coating on fabric substrate:
   a) PCL
   b) PCL+GNP (5 mg)
   c) PCL+GNP (10 mg)
   d) PCL+GNP (5 mg)+ZNO (5 mg)
3) Coating on resin substrate:
   a) PCL
   b) PCL+GNP (5 mg)
   c) PCL+GNP (10 mg)
   d) PVP+PCL+GNP (5 mg)+ZNO (5 mg)

To carry out the adhesion tests, the transparent pressure-sensitive adhesive tape number "#600" of 3M (ASTM D3359) was used, with a width of 25.4 mm and an adhesion force (on an aluminum substrate) equal to 3.5 N/cm.

Figure 11:
FIG. 11 shows an image and technical features of 3M #600 adhesive tape used for the adhesion tests.

The technical features of the adhesive tape used are summarized in FIG. 11.

The adhesion test was performed according to the requirements of the AST D3330 standard, which requires, after applying the adhesive tape on the specimen, the removal of the same at a 180° angle with respect to the horizontal plane.

The following paragraphs show the results of the adhesion tests carried out. In particular, analyses were carried out with an Atomic Force Microscope (AFM) for the quantitative measurement of the degree of adhesion on each substrate of the polymer binder forming the coating and analysis by SEM to determine if the nanostructures detached from the binder itself during the test.

AFM analyses were carried out to evaluate the adhesion of the polymer matrix to the different substrates.

Figure 12:
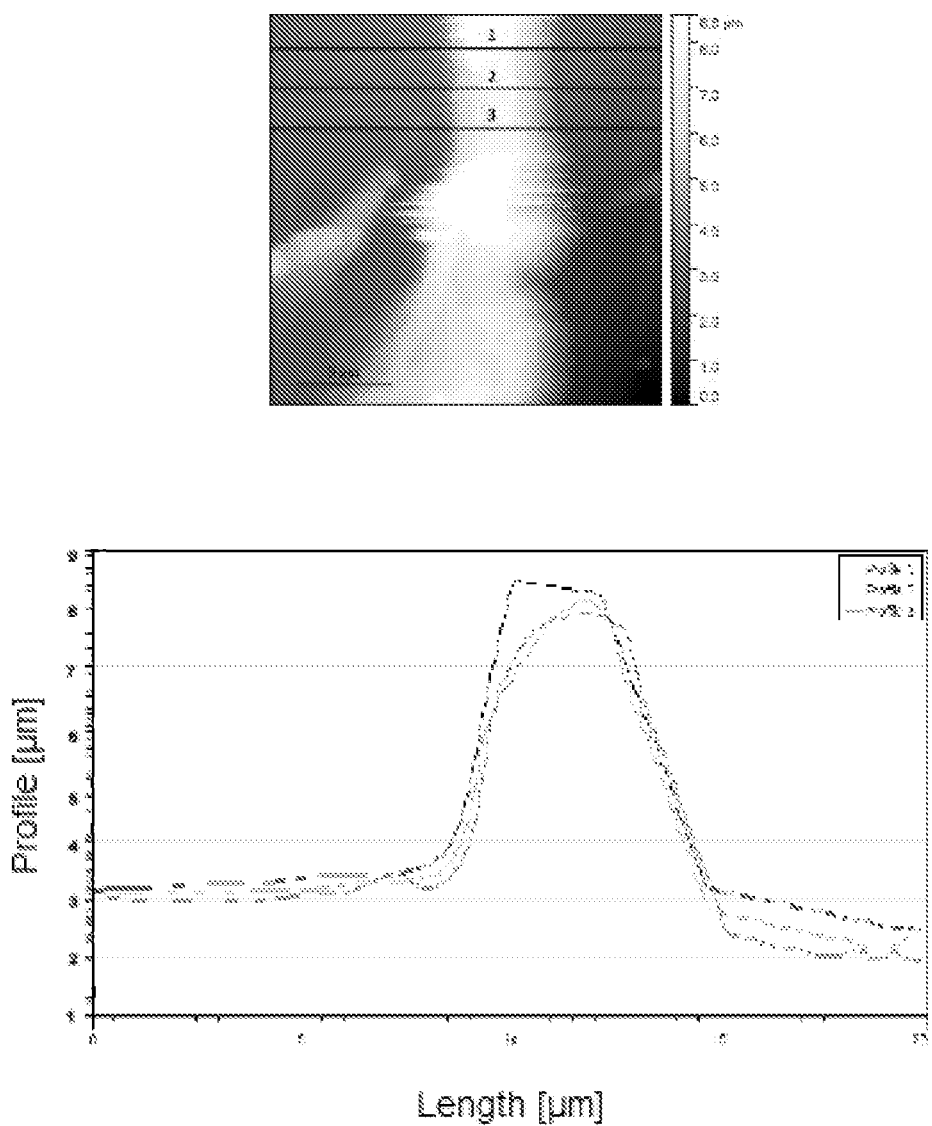
FIG. 12 shows an AFM image (left) and surface profile (right) of the PCL polymer binder on a fabric substrate.
Figure 13:
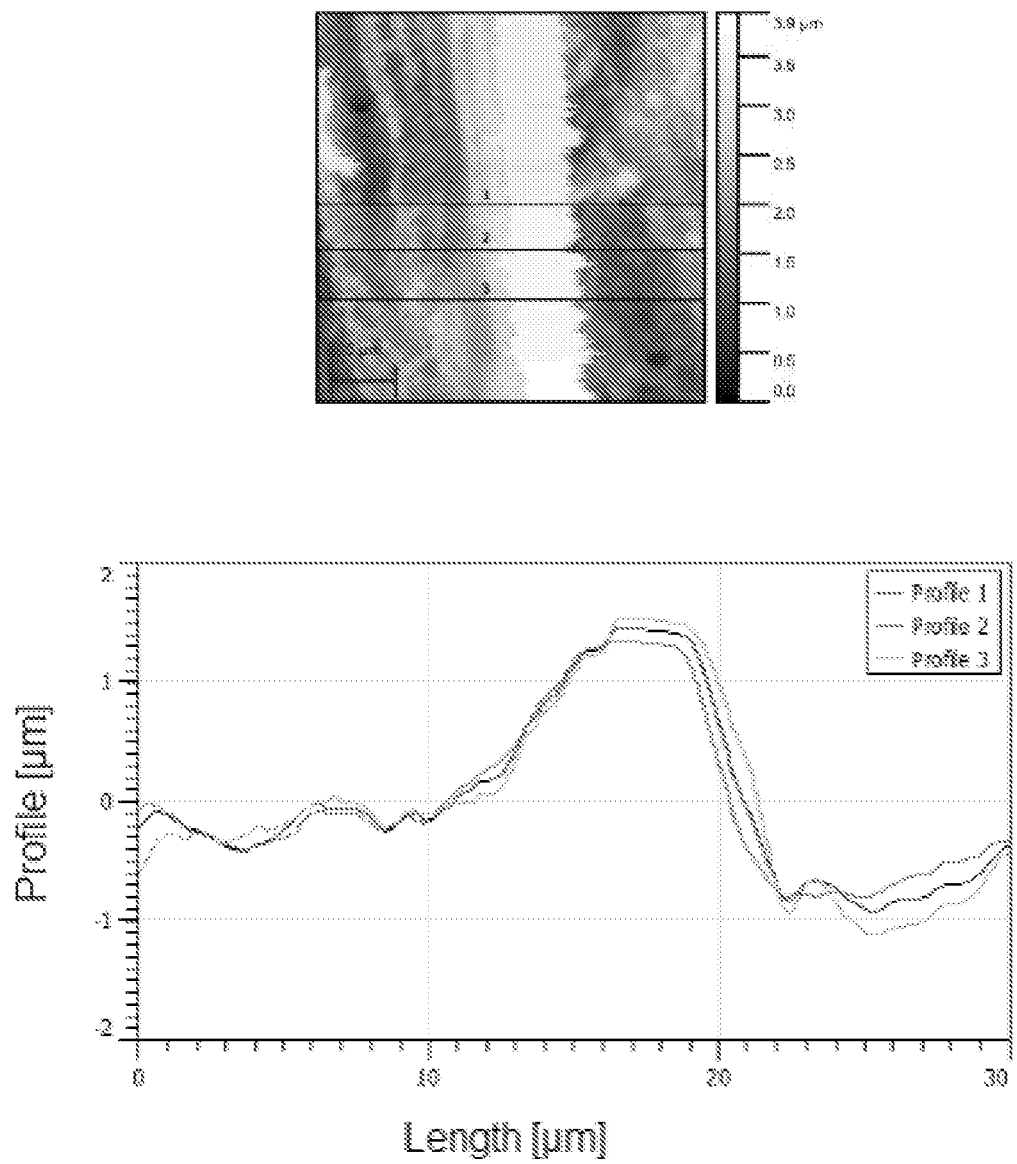
FIG. 13 shows an AFM image (left) and surface profile (right) of the PCL polymer binder on a resin substrate.
Figure 14:
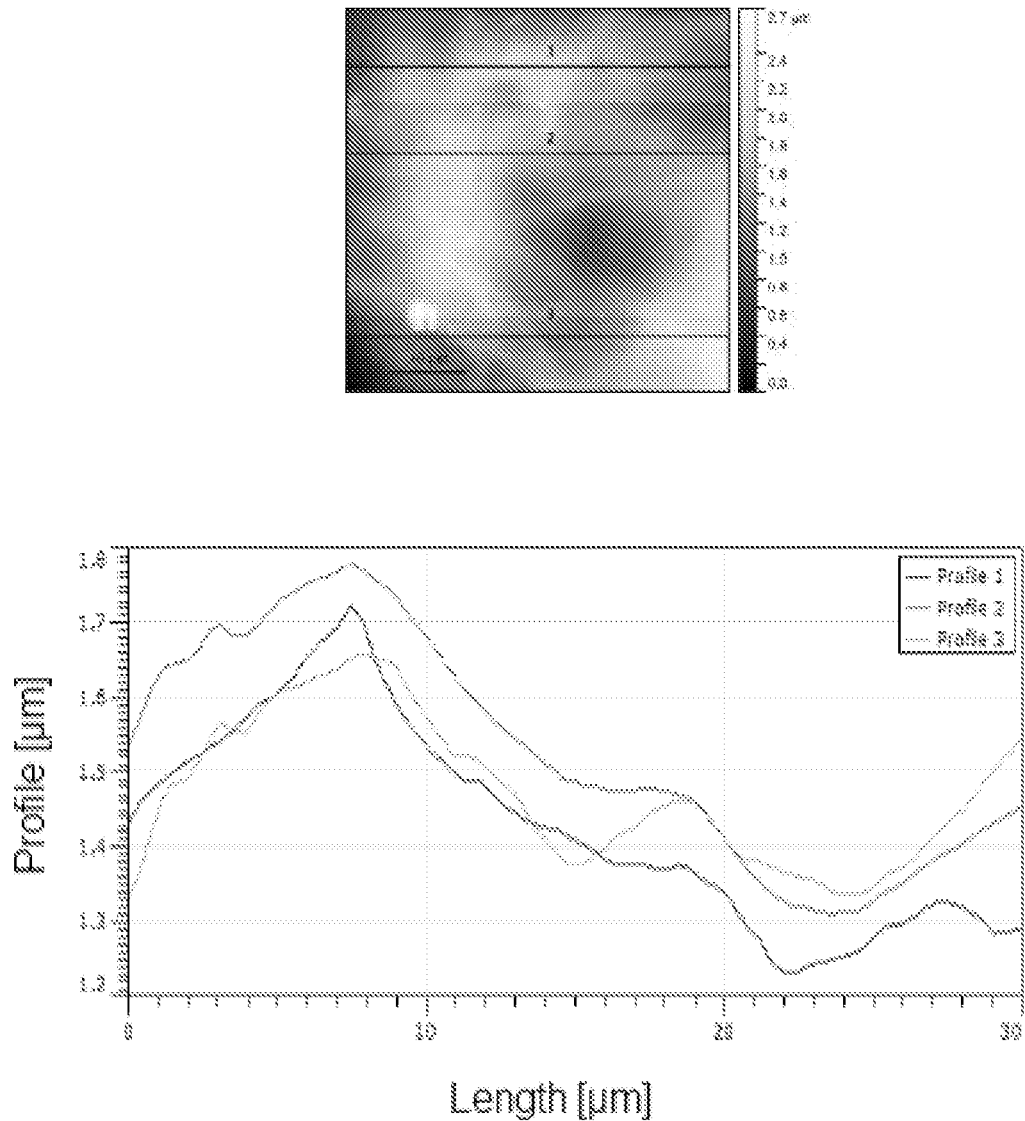
FIG. 14 shows an AFM image (left) and surface profile (right) of the PVP+PCL polymer binder on a metal substrate.

FIGS. 12, 13 and 14 depict the morphology of the sample surface at the border between the surface of the coating as is and the surface of the coating on which the adhesion test was carried out, of which the AFM images and the respective graphs are reported related to a single polymer binder for each substrate. The graphs depict the profile of the sample straddling the two areas mentioned above in three different sections.

Observing such results, it can be said that PCL adheres to both the resin substrate and the fabric substrate, as following the adhesion test the coating was removed for a negligible thickness, equal to about 800 nm. It is further observed that the lighter central part, characteristic of the images in FIG. 12 and FIG. 13, represents the border area between the area subjected to the adhesion test and the area of the coating as is. At this area, a slight lifting of the coating occurs, which occurs during the removal of the adhesive tape.

The binder consisting of PVP+PCL on an aluminum substrate appears to adhere completely thereto to such an extent that it becomes impossible to clearly observe the separation limit between the two previously mentioned areas.

In order to determine whether the adhesion test caused a detachment of the nanostructures from the polymer matrix, SEM analyses were carried out, the images of which are shown in the following figures as regards, by way of example, the concentration of 5 mg for the different nanostructures. They show a comparison between the morphology of the coating before and after performing the adhesion test.

The following samples were analyzed by SEM:
Aluminum substrate (FIG. 15): PVP+PCL+GNP (5 mg)+ZNO (5 mg)
Resin substrate (FIG. 16): PCL+GNP (10 mg)
Synthetic fabric substrate (FIG. 17): PCL+GNP (5 mg)+ZNO (5 mg)

Figure 15:
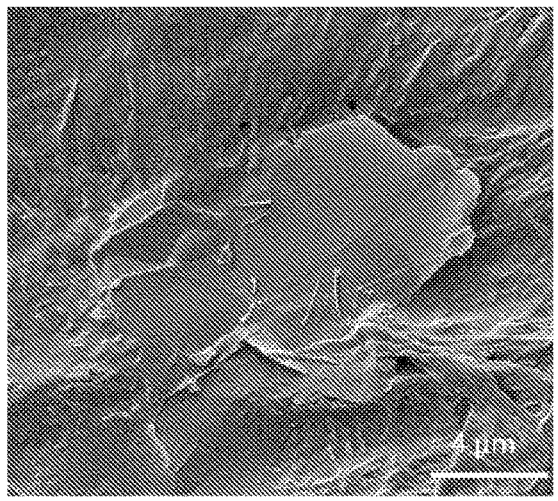
FIG. 15 shows SEM images on aluminum substrate before the test (a) and after the test (b).
Figure 15:
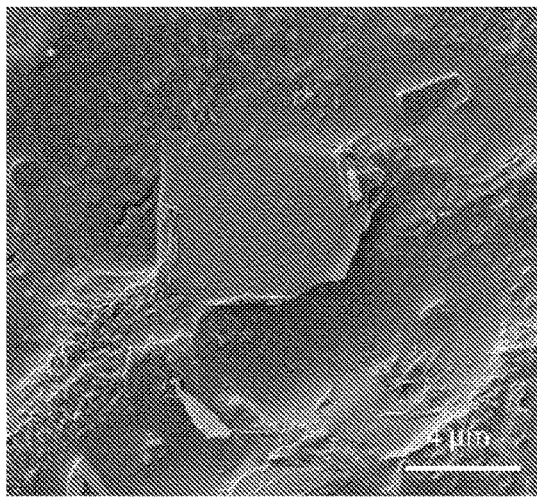
Figure 16:
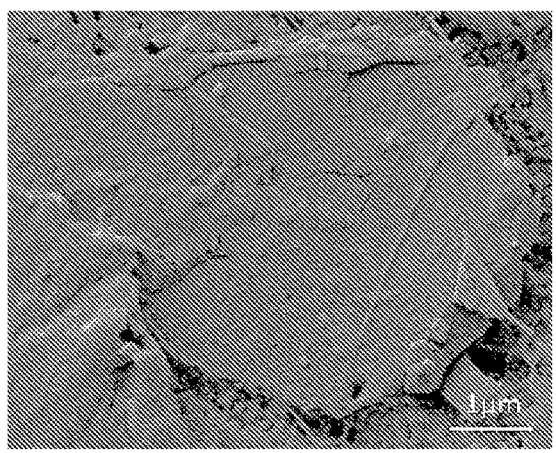
FIG. 16 shows SEM images on resin substrate before the test (a) and after the test (b).
Figure 16:
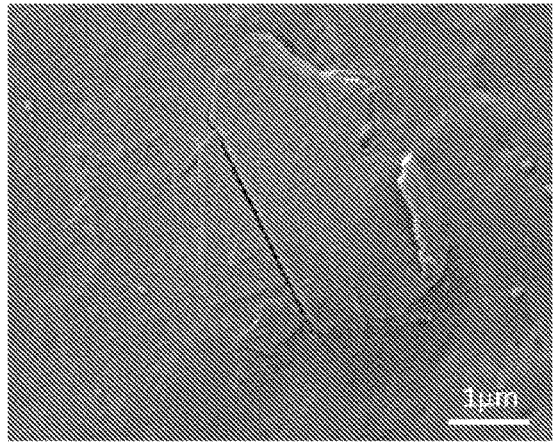
Figure 17:
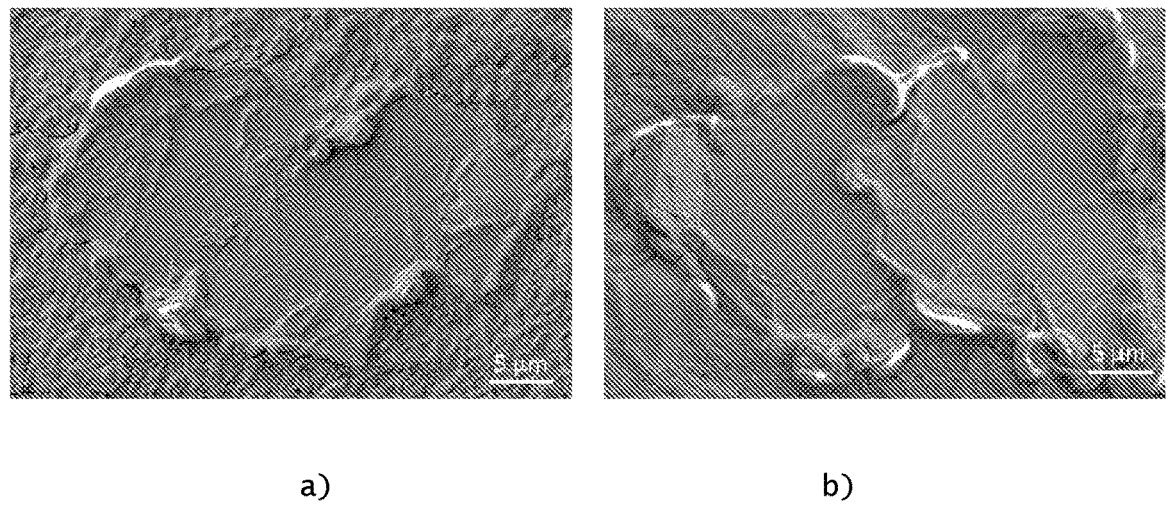
FIG. 17 shows SEM images on fabric substrate before the test (a) and after the test (b).

From FIGS. 15, 16 and 17 it can be seen that, even after the adhesion test was carried out, the nanostructures remain adhered to the polymer binder.

In conclusion, it can be stated that the polymer coatings loaded with graphene and zinc oxide-based nanostructures adhere to all three substrates on which they have been deposited, showing satisfactory results.

As for the polymer binders, PCL adheres to both resin and fabric well, while the binder consisting of PVP+PCL ensures good adhesion of the coating to the metal substrate.

The SEM analyses also show that even the nanostructures are well adhered to the polymer and therefore remain anchored to the substrate.

The measurement of the thicknesses of each coating was obtained as the difference between the total measurement of the substrate+coating thickness and the measurement of the thickness of the substrate as is. To this end, the specimens were previously prepared by covering a portion of the total surface thereof with Kapton, which was then removed after the coating was deposited.

The measurement of the coating thicknesses was carried out by means of an analog micrometer from Mitutoyo, with an accuracy level of ±1 μm.

The two following tables summarize the thickness values of each coating deposited on a fabric and plastic substrate (Table 7) and on a metal substrate (Table 8)

TABLE 7

| | SUBSTRATE: Fabric and resin | | | | |
|---|---|---|---|---|---|
| COATING | Thickness [μm] | | | Thickness average [μm] | Standard dev. |
| PCL | 11.00 ± 1 | 10.00 ± 1 | 9.00 ± 1 | 10.00 ± 1 | 1.00 |
| PCL + GNP (5 mg) | 15.00 ± 1 | 16.00 ± 1 | 14.00 ± 1 | 15.00 ± 1 | 1.00 |
| PCL + GNP (10 mg) | 15.00 ± 1 | 16.00 ± 1 | 14.00 ± 1 | 15.00 ± 1 | 1.00 |
| PCL + GNP + ZNO | 15.00 ± 1 | 16.00 ± 1 | 18.00 ± 1 | 16.33 ± 1 | 1.53 |

TABLE 8

| | SUBSTRATE: Metal | | | | |
|---|---|---|---|---|---|
| COATING | Thickness [μm] | | | Thickness average [μm] | Standard dev. |
| PVP + PCL | 10.00 ± 1 | 11.00 ± 1 | 10.00 ± 1 | 10.33 ± 1 | 0.58 |
| PVP + PCL + GNP (5 mg) | 12.00 ± 1 | 11.00 ± 1 | 14.00 ± 1 | 12.33 ± 1 | 1.53 |
| PVP + PCL + GNP + ZNO | 15.00 ± 1 | 17.00 ± 1 | 16.00 ± 1 | 16.00 ± 1 | 1.00 |

To evaluate the antimicrobial efficacy of the multi-layer treatments of the different surfaces, tests were carried out with different bacteria, the results reported below were obtained using, by way of non-limiting example, the 5 mg concentration for the nanostructures used. Once treated, the surfaces were first sterilized by UV rays and then contaminated with different types of pathogenic bacteria, by way of non-limiting example, the data on the *Staphylococcus aureus* bacterium for Gram-positive and the bacterium *Pseudomonas aeruginosa* for Gram-negative are reported here.

In this regard, an aqueous suspension of bacteria was applied on both the material treated only with polymer binder, and with the mixture of binders and nanomaterials of the present invention. The inoculated materials were then incubated in environmental temperature and humidity conditions at different times. The extraction of the bacterial load from the tested surfaces, whether metal, plastic or textile, was carried out by making some changes to the IS022196 standard, which defines the standard method for evaluating the effectiveness of antibacterial treatments on porous and non-porous materials.

After the established incubation period, the residual bacterial load was recovered from the surfaces of the specimens by rubbing with a sterile swab, which was in turn immersed in a physiological solution. The number of colony forming units (CFUs) present in the resulting suspension was then obtained using standard techniques for the determination of colony forming units. The survival of the single bacterial species on the surfaces of the materials coated with the polymer alone at the exposure time zero was evaluated as 100%, to which the viability obtained in the samples covered by the nanostructures with or without ZnO nanorods mixed with the polymer at different treatment times was compared.

Figure 18:
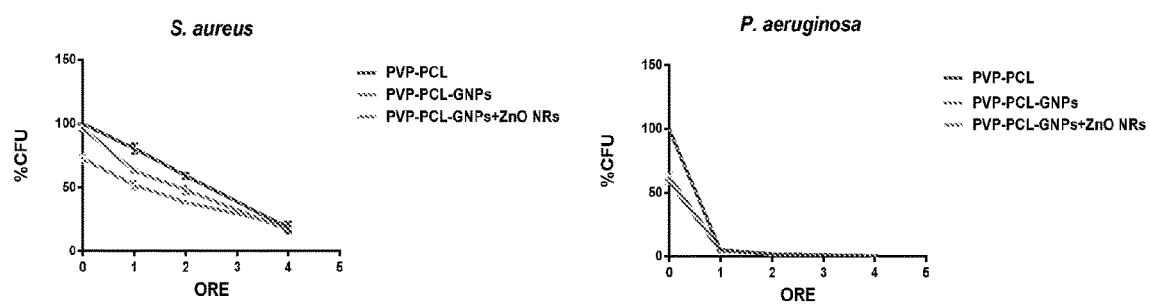
FIG. 18 shows the antimicrobial tests of the polymer binder of the present invention on a metal surface contaminated by two different types of bacteria. The image shows the microbial load of each sample considering as 100% the value of the surface coated only by the polymer binder at time zero.

FIG. 18 shows the survival trends of the two bacteria taken from metal substrates coated by the polymer binder: the decrease in microbial load at the level of the surfaces treated with nanomaterials with respect to those without is apparent already from the first hour of exposure in both types of bacteria, a result which appears more marked in the case of *P. aeruginosa*, having a vitality percentage of 60% from the initial contamination time.

Figure 19:
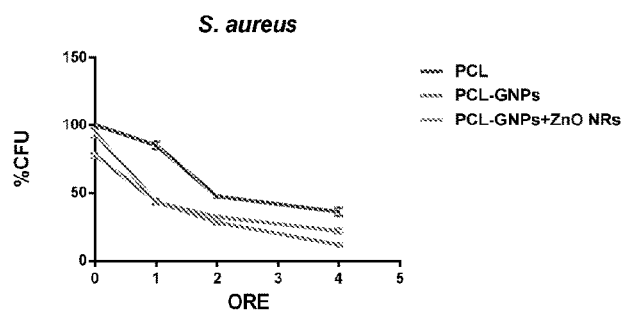
FIG. 19 reports the survival of *S. aureus* cells exposed to fabric surfaces coated with the product of the present patent, using different nanomaterials mixed with the polymer binder at different times. In the image, the microbial load of each sample is shown considering as 100% the value of the fabric substrate coated only by the polymer binder at time zero.

The antimicrobial tests instead conducted on fabric substrates coated by the binder with or without the nanomaterials show how the treatment of the present invention has a marked antibacterial effect against the Gram-positive *S. aureus* with respect to the control with only polymer already after only one hour of exposure (with about 60% mortality), continuing to increase with the passage of time (FIG. 19). Less significant differences are obtained with the Gram-negative *P. aeruginosa*, where the trend of the survival curves is almost similar (data not shown).

Figure 20:
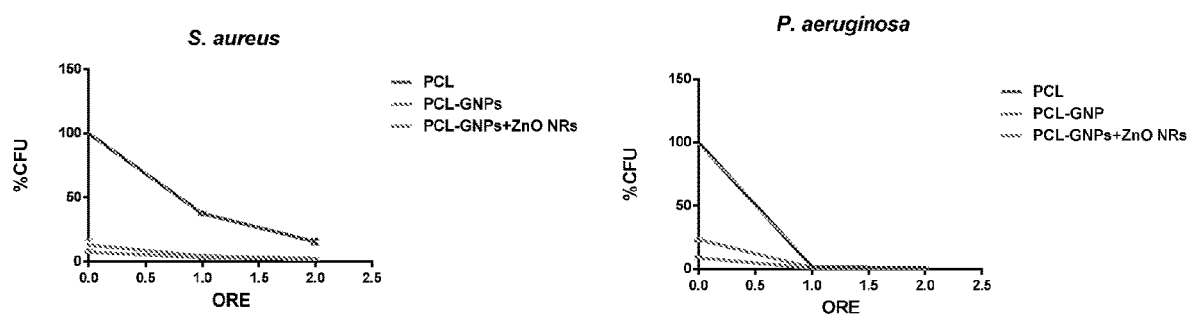
FIG. 20 reports the antimicrobial tests of the binder of the present invention on a resin substrate contaminated by two different types of bacteria. In the image the microbial load of each sample is shown considering as 100% the value of the substrate coated by the polymer binder free of nanomaterials at time zero.

From the bacterial contamination of resin surfaces bearing the polymer matrix under examination supplemented or not with the nanostructures, a significantly lower recovery of still viable cells is obtained from the treated resin substrates with respect to the control samples, already from the first instants of contact. As shown in FIG. 20, this result is observed for both types of bacteria tested.

Figure 21:
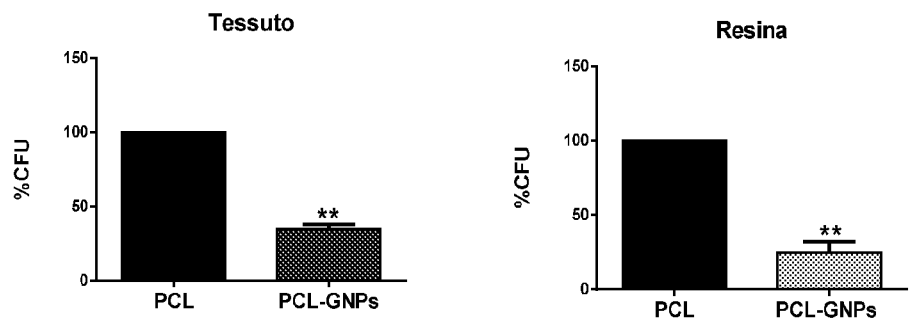
FIG. 21 reports the evaluation of the antimicrobial effect of the treatment of the invention deposited on the surface of fabric (left) and resin (right) specimens in a closed environment. The data are expressed considering substrates with only polymer as control. P value <0.05.

The ability to control and limit the biological risk which may be present on the types of surfaces previously analyzed and present in indoor environments was also assessed. Plastic and fabric samples covered by the binder of such an invention were analyzed by evaluating the total microbial load present on the surfaces after 15 days of exposure. By way of non-exhaustive example, we report data regarding graphene nanoplatelets as a nanostructural base. The samples of material coated with only the polymer or binder of the present invention were sterilized and then placed on a support surface inside a room and exposed to air for 15 days. After this period of time, they were processed as described above and the relative microbial counts are shown in FIG. 21. A high antimicrobial effect of the treatment of the present invention is apparent, both at the fabric and resin level, which proves to be valid even after two weeks of exposure.

Similar experiments were carried out in a hospital environment as well. In particular, the monitoring of the antimicrobial capacity of the treatment of the present invention occurred in two different environments of the UOC of Pediatric Dentistry of Policlinico Umberto I, which has intense outpatient activity, with more than 15,000 visits per year.

Figure 22:
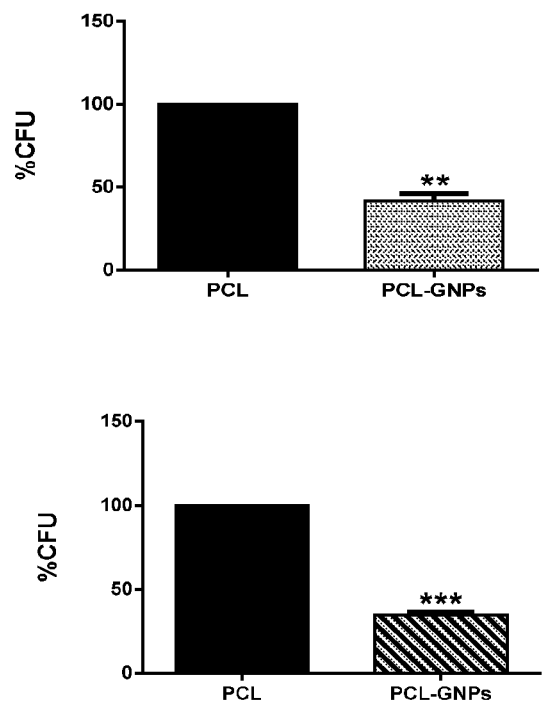
FIG. 22 reports the evaluation of the antimicrobial effect of the treatment of the invention deposited on the surface of fabric (left) and resin (right) specimens in the pediatric odontostomatology unit. The data are expressed considering substrates with only polymer as control. P value <0.05.

In this case, the results of the tests carried out on the treatment deposited on a plastic substrate in the two different environments of the clinic, reported by way of non-exhaustive example, also show a high antimicrobial capacity of the treatment of the present invention towards the microorganisms present in the environment (FIG. 22).

The invention claimed is:

1. A method for manufacturing a removable, waterproof multi-layer coating having antibacterial and anti-COVID properties which uses, as an antibacterial and anti-COVID agent, graphene nanoparticles and zinc oxide nanorods or graphene nanoparticles decorated with zinc oxide nanorods, the method being applicable by spraying on different contact surfaces, made of metal, fabric, or plastic, said method including the following steps:
   a) preparing at least one polymer solution based on a first sprayable polymer to be used in the form of a continuous film as a coating on the surface to be treated, serving a first function of "host layer" to promote the optimal dispersion and surface distribution of said graphene nanoparticles and zinc oxide nanorods or graphene nanoparticles decorated with zinc oxide nanorods which, when sprayed on said coating as an antibacterial and anti-COVID agent, remain partially exposed above the free surface thereof, and a second function of ensuring adhesion to the surface to be coated, thus promoting the formation of said continuous film on said surface to be coated;
   b) preparing the nanoparticles to be sprayed on said film, by thermally expanding the interdispersed graphene then sonicated for 20 minutes in acetone, by means of a probe sonicator and then sonicating the ZnO nanorods in acetone for 3 minutes, by means of an ultrasonic bath thus obtaining nanostructures based on graphene and zinc oxide;
   c) spraying the polymer solution obtained in step a) on the surface to be treated to form a continuous film adhered to the same surface acting as a "host layer"; and
   d) superficially depositing, again by spraying, the nanostructures based on graphene and zinc oxide, or graphene decorated with zinc oxide nanorods, obtained in step b) on said host layer, to form an antibacterial and anti-COVID barrier on said surface, by virtue of the sharp edges of the nanostructures which, protruding externally, interact directly on the cell membranes;
   where the polymer forming the "host layer" is selected from Polyvinylpyrrolidone, or polymer 2, which has excellent adhesion to metal surfaces, and Polycaprolactone, or polymer 1, which is a semi-crystalline polymer with a low melting point of about 60° C. and a glass transition temperature of about −60° C., which has excellent adhesion to polymer resin and fabric surfaces, and a poor solubility in water.

2. The method according to claim 1, wherein ethanol is used as a solvent for PVP at room temperature using a magnetic stirrer, while PCL is dissolved in acetone at a temperature of 30° C. using a magnetic stirrer.

3. The method according to claim 2, wherein the different polymer concentrations vary between 1% and 15% by weight in the solvent and polymer mixtures.

4. The method according to claim 2, wherein there are three different types of nanostructures dispersed on the surface of the polymer "host layer", used in a concentration range between 2 mg and 10 mg on 100 mg of polymer forming the host layer:
   a) Graphene nanoplatelets,
   b) Zinc oxide nanorods, where nanorod indicates a morphology of objects on the nanoscale, with a rod shape, wherein the average diameter is between 20 nm and 50 nm and the length is between 100 nm and 1 μm; and
   c) graphene nanoplatelets decorated with zinc oxide nanorods;
   or as a replacement, to minimize the nanomaterial, GNP and ZNO nanostructure production costs and times.

5. The method according to claim 2, wherein in the nanoparticles used for spraying, the interdispersed graphene has been thermally expanded and then sonicated for 20 minutes in acetone, by means of a probe sonicator, while the ZnO nanorods are sonicated in acetone for 3 minutes, by means of an ultrasonic bath.

6. The method according to claim 1, wherein the different polymer concentrations vary between 1% and 15% by weight in the solvent and polymer mixtures.

7. The method according to claim 6, wherein there are three different types of nanostructures dispersed on the surface of the polymer "host layer", used in a concentration range between 2 mg and 10 mg on 100 mg of polymer forming the host layer:
   a) Graphene nanoplatelets,
   b) Zinc oxide nanorods, where nanorod indicates a morphology of objects on the nanoscale, with a rod shape, wherein the average diameter is between 20 nm and 50 nm and the length is between 100 nm and 1 μm; and
   c) graphene nanoplatelets decorated with zinc oxide nanorods;
   or as a replacement, to minimize the nanomaterial, GNP and ZNO nanostructure production costs and times.

8. The method according to claim 6, wherein in the nanoparticles used for spraying, the interdispersed graphene has been thermally expanded and then sonicated for 20 minutes in acetone, by means of a probe sonicator, while the ZnO nanorods are sonicated in acetone for 3 minutes, by means of an ultrasonic bath.

9. The method according to claim 1, wherein there are three different types of nanostructures dispersed on the surface of the polymer "host layer", used in a concentration range between 2 mg and 10 mg on 100 mg of polymer forming the host layer:
   a) Graphene nanoplatelets (GNP),
   b) Zinc oxide nanorods-(ZNO), where nanorod indicates a morphology of objects on the nanoscale, with a rod shape, wherein the average diameter is between 20 nm and 50 nm and the length is between 100 nm and 1 μm; and
   c) graphene nanoplatelets decorated with zinc oxide nanorods;
   or as a replacement, to minimize the nanomaterial, GNP and ZNO nanostructure production costs and times.

10. The method according to claim 9, wherein in the nanoparticles used for spraying, the interdispersed graphene has been thermally expanded and then sonicated for 20 minutes in acetone, by means of a probe sonicator, while the ZnO nanorods are sonicated in acetone for 3 minutes, by means of an ultrasonic bath.

11. The method according to claim 1, wherein in the nanoparticles used for spraying, the interdispersed graphene has been thermally expanded and then sonicated for 20 minutes in acetone, by means of a probe sonicator, while the ZnO nanorods are sonicated in acetone for 3 minutes, by means of an ultrasonic bath.

12. The method according to claim 1, wherein the polymer film is a multi-layer film in which the constituent elements are arranged on two or more subsequent layers, the different layers being sprayed on the surface to be coated based on the substrate adhesion and water-repellant properties thereof and based on the antibacterial and anti-COVID properties thereof.

13. The method of claim 1, further comprising using a second polymer solution based on a second polymer, in place of or in combined action with the first polymer forming the "host layer", so that the creation of the nanoparticle barrier, the adhesion to the surface to be coated, and the creation of a continuous film are simultaneously ensured.

14. The method according to claim 13, wherein the different polymer concentrations vary between 1% and 15% by weight in the solvent and polymer mixtures.

15. The method according to claim 13, wherein there are three different types of nanostructures dispersed on the surface of the polymer "host layer", used in a concentration range between 2 mg and 10 mg on 100 mg of polymer forming the host layer:
 a) Graphene nanoplatelets,
 b) Zinc oxide nanorods, where nanorod indicates a morphology of objects on the nanoscale, with a rod shape, wherein the average diameter is between 20 nm and 50 nm and the length is between 100 nm and 1 µm; and
 c) graphene nanoplatelets decorated with zinc oxide nanorods;
 or as a replacement, to minimize the nanomaterial, GNP and ZNO nanostructure production costs and times.

16. A removable, waterproof multi-layer coating with antibacterial and anti-COVID properties, comprising at least one polymer film acting as a "host layer" on which graphene nanoparticles and zinc oxide nanorods are sprayed as an antibacterial agent, which remain partially exposed above the free surface, said polymer film being either directly adhered by spraying to the surface to be coated by spraying to a second polymer film, in turn adhered by spraying to the surface to be coated, and used as an element to promote the adhesion to said surface to be coated of the first polymer film forming the antibacterial and anti-COVID coating, the polymer material used to create the coating consisting of Polycaprolactone, or polymer, which is used individually on fabric or resin surfaces and also acts as a binder for nanoparticles, and which is used in combination with a film made of Polyvinylpyrrolidone, or polymer, on metal surfaces, where the Polyvinylpyrrolidone acts as a coating and as a support for the Polycaprolactone and the Polycaprolactone acts as a binder for the nanoparticles.

17. A multi-layer coating having antibacterial and anti-COVID properties according to claim 16, wherein there are three different types of nanostructures dispersed in the active suspensions, used in a concentration range between 2 mg and 10 mg:
 a) Graphene nanoplatelets,
 b) Zinc oxide nanorods, where nanorod indicates a morphology of objects on the nanoscale, with a rod shape, wherein the average diameter is between 20 nm and 50 nm and the length is between 100 nm and 1 µm; and
 c) graphene nanoplatelets decorated with zinc oxide nanorods;
 or, as a replacement,
 GNP and ZNO nanostructures, where the combination of GNP and ZNO is usable in place of the graphene nanoplatelets decorated with zinc oxide nanorods, so as to minimize the nanomaterial production costs and times.

18. The multi-layer coating according to claim 17, wherein, in case of an aluminum surface, the coating consists of a three-layer film, superimposing the aluminum layer first with polymer 2, thus taking advantage of the optimal metal adhesion thereof, even if poorly hydrophobic, and then superimposing polymer 1 used as a binder on this layer of polymer 2, so as to obtain excellent hydrophobicity features and optimal adhesion to the polymer substrate, the GNP and ZNO nanostructures or the combination of the two being then sprayed on said film of polymer 1.

19. The multi-layer coating according to claim 16, wherein, in case of a fabric substrate, the coating consists of a single antimicrobial and anti-COVID film consisting of GNP and GNP+ZnO nanorods distributed on the binder of polymer 1.

20. A kit for manufacturing a removable, waterproof multi-layer antimicrobial coating for contact surfaces in environments to be sanitized according to claim 16, comprising:
 a dispenser containing a first sprayable polymer solution based on PCL, to be used individually on fabric or resin surfaces and which acts as a coating and as a binder for the nanostructures;
 a dispenser containing active sprayable suspensions of nanostructures;
 a dispenser containing a second sprayable polymer solution based on PVP for metal surfaces which acts as a coating and as a support to the first polymer solution based on PCL which acts as a binder for the nanoparticles.

* * * * *